United States Patent [19]

Wu

[11] Patent Number: 4,998,768
[45] Date of Patent: Mar. 12, 1991

[54] VEHICLE SUNSHADE

[76] Inventor: Kenneth K. L. Wu, 19417 Trentham Ave., Cerritos, Calif. 90701

[21] Appl. No.: 268,369

[22] Filed: Nov. 7, 1988

[51] Int. Cl.⁵ .................................................. B60D 25/06
[52] U.S. Cl. ..................................... 296/136; 296/210; 296/979; 135/88
[58] Field of Search .............. 296/136, 210, 211, 97.9; 135/88

[56] References Cited

U.S. PATENT DOCUMENTS

| | | | |
|---|---|---|---|
| 2,608,942 | 9/1952 | Smith | 150/166 |
| 2,628,123 | 2/1953 | Lyon | 150/166 |
| 2,635,615 | 4/1953 | Rice | 135/5 |
| 3,476,436 | 11/1969 | Martin | 296/95 |
| 3,917,340 | 11/1975 | Aguirre | 296/210 |
| 3,957,301 | 5/1976 | Huber | 296/97.1 |
| 4,068,885 | 1/1978 | Berger | 296/77.1 |
| 4,805,654 | 2/1989 | Wang | 296/136 |

FOREIGN PATENT DOCUMENTS 197806  6/1978  Switzerland ...................... 296/136

Primary Examiner—David M. Mitchell
Assistant Examiner—Richard Camby
Attorney, Agent, or Firm—Danton K. Mak

[57] ABSTRACT

A sunshade comprises a frame which is removably attached to a vehicle roof by brackets affixed to the vehicle roof. The frame comprises pivotally attached sections. The sections are removably inserted into elongated pockets found in a flexible cover. When attached to the cover and installed onto the vehicle roof, the sections are aligned parallel to the vehicle roof and hold the cover taut over the vehicle roof. The rest of the cover drapes the vehicle windows. When not in use, the frame is removed from the roof and its sections are aligned side-by-side for compact storage.

7 Claims, 3 Drawing Sheets

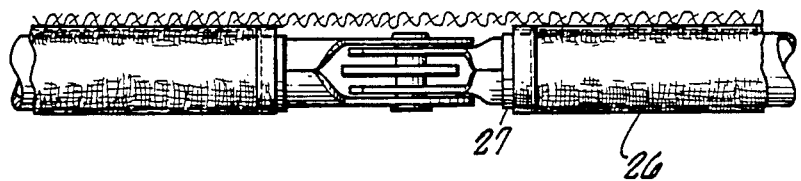
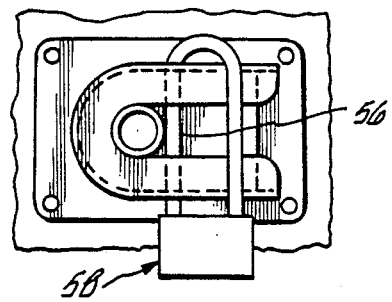
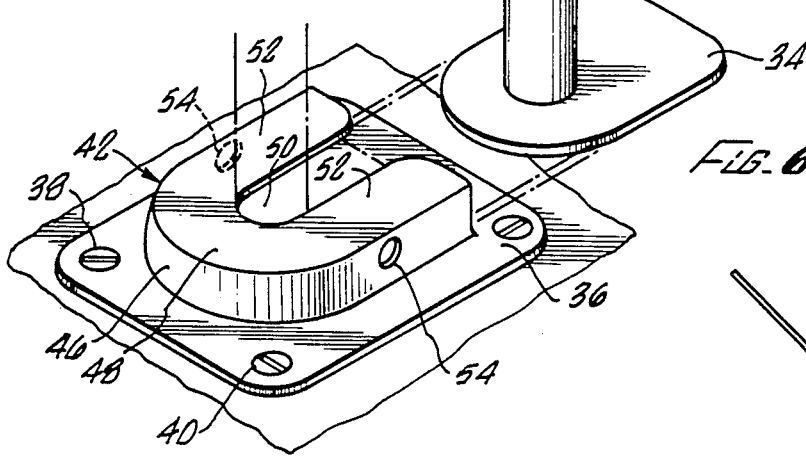
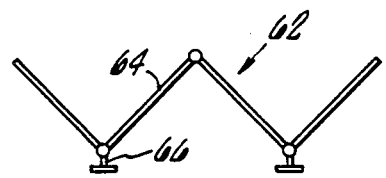
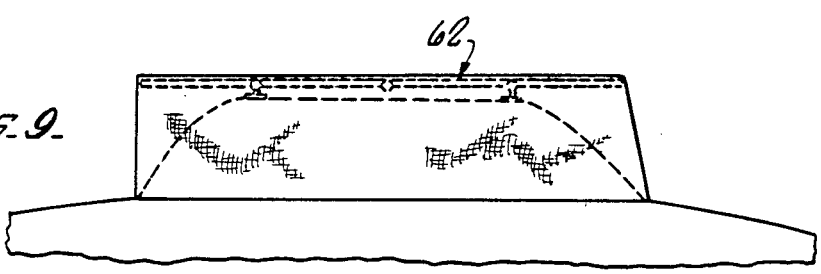

VEHICLE SUNSHADE

BACKGROUND

The present invention is directed to a sunshade or sunscreen for a vehicle.

As is well known, due to the large areas of glass and the metallic roof of vehicles, vehicles are readily heated up by the sun's rays. The heat causes discomfort to occupants and deteriorates the vehicle's interior. Additionally, the ultraviolet rays of the sun bleach the vehicle's interior.

Conventional methods for reducing the heating and bleaching effects are costly, ineffective or inefficient, for example, cooling by an air conditioner, or use of higher heat dissipation fabrics for the interior of vehicle. For instance, it is infeasible to use an air conditioner for cooling the interior while a vehicle is parked.

Several types of prior sunshades as described in U.S. Pat. Nos. 4,068,885; 3,917,340; 3,476,436; 2,635,615; 2,608,942; 2,628,123; and 3,957,301. These sunshades have one or more of the following disadvantages: cumbersome size and shape; shade only the roof but not the windows of the vehicle; unadjustable for vehicles of different sizes; not readily removable; not readily collapsible into a compact storage position; or permanently attached to the roof causing higher fuel consumption due to air resistance during a vehicle's motion.

Accordingly, there is a need for a vehicle sunshade that overcomes the above disadvantages, yet is simple, easy to set up, easy to fold into compact storage, and is inexpensive to produce and maintain.

SUMMARY

The present invention provides a sunshade that satisfies this need. The sunshade is useful for a vehicle having a roof and windows, including at least a front window and one side window. The sunshade comprises as its main components a rigid supporting frame, means for removably attaching the frame to the roof of a vehicle, and a flexible cover for the vehicle. The attaching means are secured to the vehicle roof. The cover is adapted to be supported by the frame in a position spaced apart from the vehicle roof so that it drapes over the front and side windows of the vehicle. This reduces heating of the vehicle's interior by the sun or discoloration of the interior of the vehicle by ultraviolet rays of the sun.

The frame typically comprises a plurality of support assemblies, each assembly comprising a rigid arm, and at least one depending leg. The attaching means can comprise a bracket secured to the vehicle roof for removably receiving the depending leg.

Preferably each arm comprises two sections pivotally connected to each other so that the two sections (i) can be aligned end-to-end when mounted on the vehicle roof and (ii) can be side-by-side so that the frame can be compactly stored away. Each arm can have at least four of the above sections pivotally connected to each other, and two depending legs.

Typically the cover is held taut over and spaced apart from the vehicle top with the remainder of the cover draping over all of the vehicle's windows.

In a preferred version of the invention, the flexible cover includes elongated pockets for removably receiving the frame sections. The pockets can be located longitudinally along the portion of the cover that traces the perimeter of the vehicle's roof.

With regard to the attaching means, each bracket can have an aperture into which a portion of the depending leg can be inserted. The brackets can be adapted so that the depending legs can be locked in place to prevent theft of the sunshade. For example, a padlock can be used to lock the bracket in location.

The sunshade protects not only the roof of the vehicle but also all the windows, keeping sunshine out of the vehicle's interior. It is spaced apart from the roof of the vehicle allowing for ventilation. The frame can be adjusted to vehicles of different sizes by moving the brackets to the desired position. Covers of different sizes are available for different sizes of cars. The sunshade cannot be easily removable, and in fact can be locked in place. It is readily collapsible into a compact storage position, and is not permanently attached to the vehicle roof, thus not interfering with gas mileage.

DRAWINGS

These and other features, aspects, and advantages of the present invention will become better understood with reference to the following description, appended claims, and accompanying drawings, where:

FIG. 4 is a top view of an arm of the sunshade of FIG. 1 taken along line 4—4 in FIG. 3;

FIG. 5 is the top view of a bracket and padlock for a portion of the sunshade of FIG. 1;

FIG. 6 is a perspective view of a portion of the bracket and depending leg of the sunshade of FIG. 1;

FIG. 7 is a perspective view of the sunshade of FIG. 1 showing the details of the elongated pockets in the cover portion of the sunshade;

FIG. 8 is a side elevation view of an alternative frame support assembly for use in a sunshade according to the present invention;

FIG. 9 is a side plan view of a vehicle on which a removable sunshade, using the alternative frame support assembly of FIG. 8, is mounted.

DESCRIPTION

Figure 1:
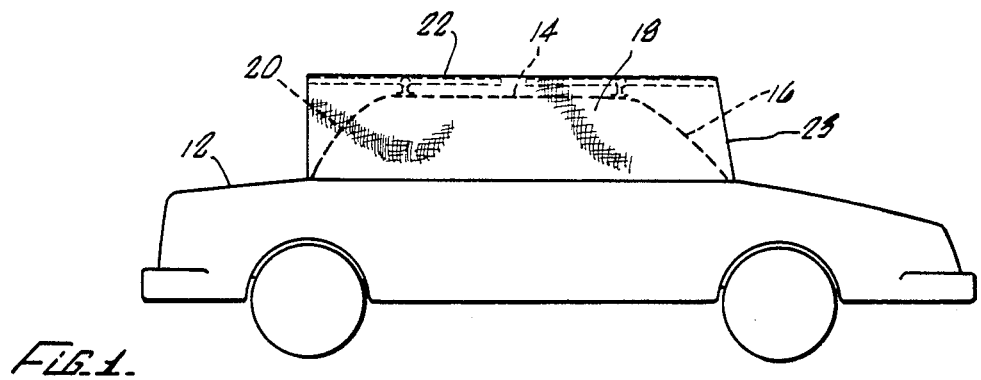
FIG. 1 is a side plan view of a vehicle on which a removable sunshade according to the present invention is mounted.

With reference to FIGS. 1-7, a removable sunshade 10 is installed on a vehicle 12 having a roof 14 and windows, including a front window 16, side windows 18, and a rear window 20. The sunshade 10 comprises (1) a rigid supporting frame 22; (2) brackets 24 for removably attaching the frame to the vehicle roof 14; and (3) a flexible cover 23 for the vehicle 12.

The rigid supporting frame 22 can be made of plastic or metal. It comprises four support assemblies 25 for mounting proximate to the four corners of the vehicle roof 14. Each support assembly 25 comprises an arm 26 and a depending leg 28. Each arm 26 has two rigid sections 27A and 27B. The two sections 27 and leg 28 are pivotally mounted to each other, the sections 27 pivoting with respect to each by means of a pawl 30 and ratchet 32 assembly. When the support assembly 25 is mounted on the vehicle roof 14, the sections 27 are aligned end-to-end and are prevented from releasing from this configuration by means of the pawl 30 and the ratchet 32. As shown in phantom in FIG. 3, by releasing the pawl 30 from the ratchet 32, the sections 27 and leg 28 can be pivoted together so they are side-by-side for compact storage.

Mounted on the bottom of each leg 28 is flat mounting plate 34. This can be welded or pressed fit onto the leg 28.

As best shown in FIGS. 5 and 6, each of the four brackets 24 comprises a flat base plate 36 having apertures 38 in its periphery for receiving fasteners such as screws 40 for attachment to the vehicle roof 14. In the center of the base plate 36 is a housing 42 comprising opposed side walls 44, an end wall 46, and a top wall 48 with a slot 50 therein. The housing 42 is sized to slidably receive the mounting plate 34 at the end of each depending leg 28 of the frame 22, with the slot 50 sized to receive the corresponding leg 28. Each leg 28 is securely and independently held by a corresponding bracket 24. The outer slot 50 in the top wall 48 forms two arms 52 surrounding the leg 28 as best shown in FIG. 6. Each side wall 44 has a circular hole 54 therein, the two holes 54 being aligned, and adapted to receive an arm 56 of a padlock 58 so that the frame 22 can be locked in place on the vehicle roof.

The cover 23 can be made of a flexible plastic, textile material, or combination of plastic and textile materials. The cover 23 is substantially rectangular in shape and preferably is sized so that when it is held up by the frame spaced apart from the vehicle roof 14, it covers both the roof and all of the windows of the vehicle. The portion of the cover 23 corresponding to the length and width of the vehicle roof 14 is held tautly by the frame 22, with the remainder of the cover 23 draping over the vehicle windows.

Figure 2:
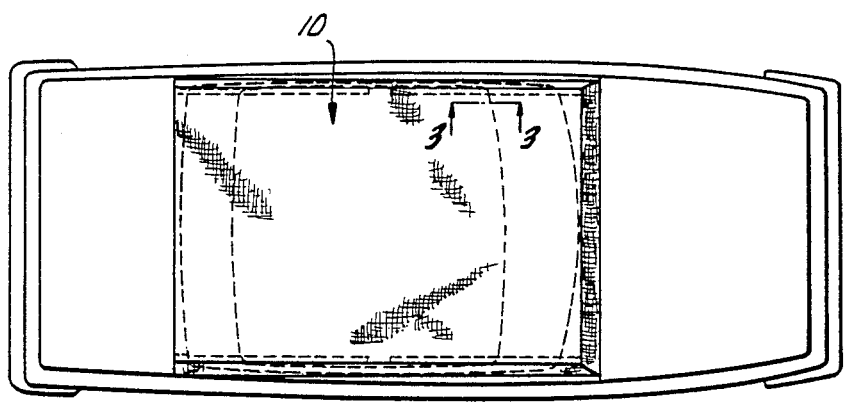
FIG. 2 is a top plan view of the removable sunshade shown in FIG. 1.

Preferably the cover 23 has elongated pockets 60 sized to receive the support assembly arm 26, as shown in FIG. 7. The elongated pockets 60 are located longitudinally along the portion of the cover 23 that traces the perimeter of the vehicle's roof 14, as shown in FIG. 2.

As shown in FIGS. 8 and 9, an alternative frame assembly 62 has four arm sections 64 and two legs 66 rather than the two arm sections and one leg of the support assembly 25 of FIG. 1. Each arm section 64 is pivotally mounted to its adjoining arm sections, and one of the legs 66 is pivotally mounted at the juncture of the first and second arm sections and the other leg 66 is pivotally mounted at the juncture of the third and fourth arm sections 64. The arm sections 64 are aligned end-to-end when positioned on a vehicle roof. The four arm sections 64 and two legs 66 can be pivoted or folded together so that the entire length of the collapsed frame assembly 62 is about that of a single arm.

Figure 10:
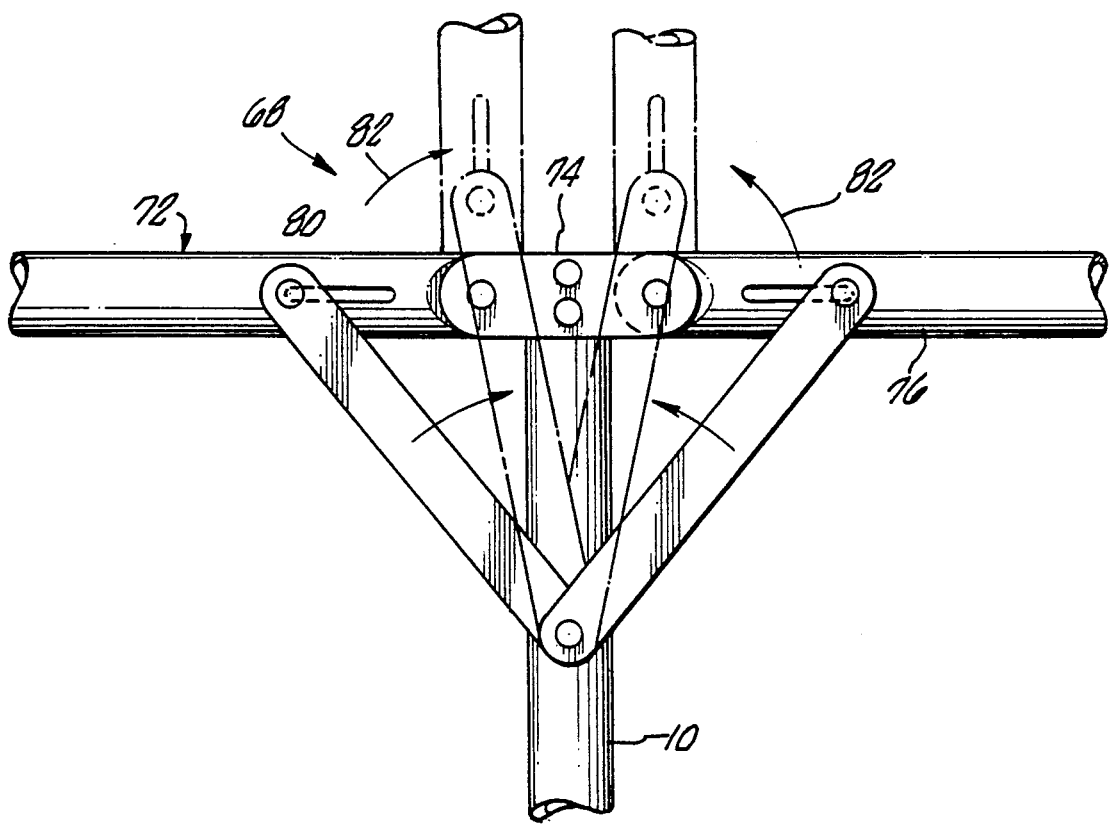
FIG. 10 is a side elevation view of a portion of another alternative frame for use in a sunshade according to the present invention.
Figure 11:
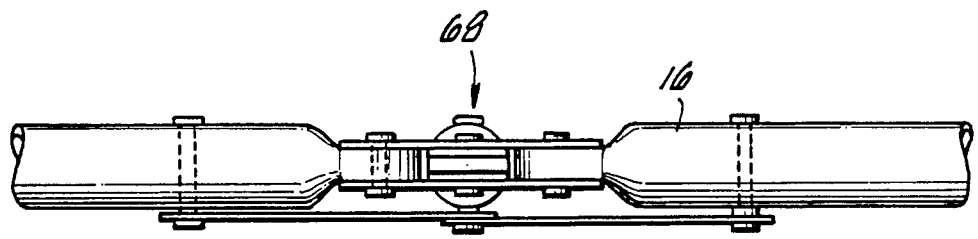
FIG. 11 is a top view of a portion of the alternative frame shown in FIG. 10.

Another alternate version 68 of the support assembly, as is shown in FIGS. 10 and 11, comprises a depending leg 70 and a rigid arm 72. The arm 72 is made up of a central segment 74 rigidly attached to the top of the leg 70, with a pair of rigid pivotally mounted sections 76 attached to the central segment 74. Each section 76 is supported by a brace 78 pivotally mounted at one end to the leg 70 and slidably mounted at the other end in a slot 80 in the corresponding section 76. An advantage of this version of the invention is that the arm sections 76 are firmly held in an extended, lateral, aligned position.

Figure 3:
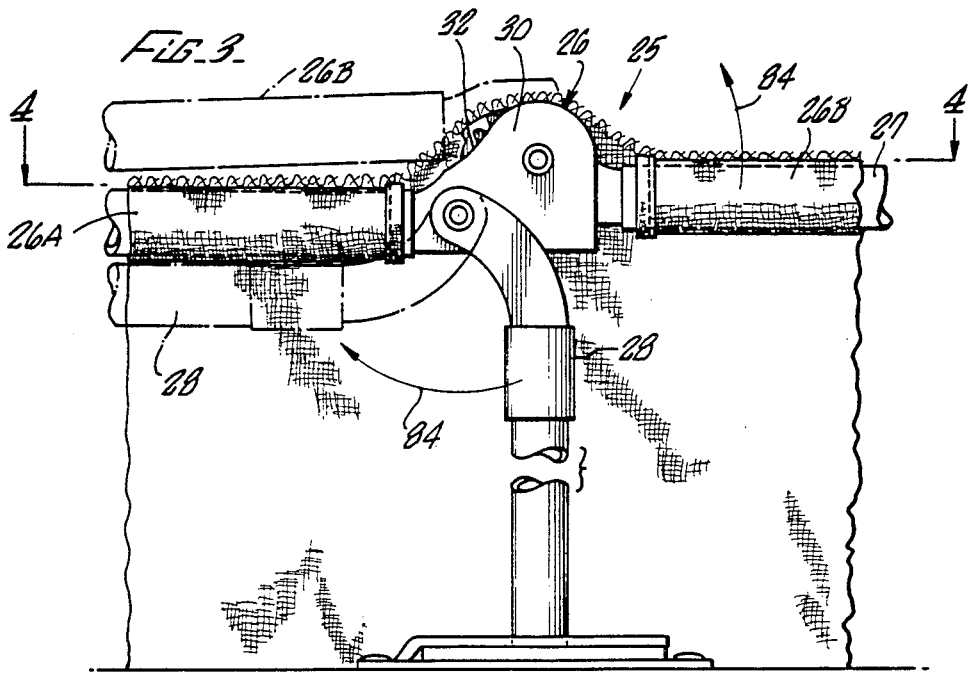
FIG. 3 is a fragmentary sectional view taken along line 3—3 through the sunshade of FIG. 2, showing a side view of an arm, when mounted on the vehicle roof, with its sections fully inserted into the elongated pockets of the cover and aligned parallel to the vehicle top.

In FIG. 10, the arrows 82 show how the arms and bracing rotate moving from the open installed position, to a closed storage position. Likewise, the arrows 84 in FIG. 3 show how one of the arm sections 27 and the leg 28 pivot from an open installed position to a storage position.

Although the present invention has been described in considerable detail with reference to certain preferred versions thereof, other versions are possible. Therefore, the spirit and scope of the appended claims should not be limited to the description of the preferred versions contained herein.

What is claimed is:

1. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   in which the frame comprises a plurality of rigid arms;
   in which each arm has a depending leg, and the attaching means comprises a bracket secured to the vehicle roof for removably receiving the depending leg;
   in which each arm comprises two sections pivotally connected to each other so that the two sections (i) can be aligned parallel to the vehicle roof when mounted on the roof, and (ii) can be side-by-side so that the frame can be stored away; and
   in which the two sections are foldable bracings pivotally attached to the depending leg so that the two sections (i) can be aligned parallel to the vehicle roof when mounted onto the roof, and (ii) can be slid into a position alongside the depending leg so that the frame can be compactly stored away.

2. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   wherein the frame is in sections and the flexible cover includes elongated pockets for removably receiving the sections of the frame; and
   in which the elongated pockets are located longitudinally along the part of the cover that traces the perimeter of the vehicle's roof.

3. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   in which the frame comprises a plurality of rigid arms;
   in which each arm has a depending leg, and the attaching means comprises a bracket secured to the vehicle roof for removably receiving the depending leg; and
   wherein each of the brackets has an aperture into which a portion of the depending leg can be inserted, and each of the brackets has a pair of arms to receive the depending leg to avoid lateral movement by the depending leg.

4. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   in which the frame comprises a plurality of rigid arms;
   in which each arm has a depending leg, and the attaching means comprises a bracket secured to the vehicle roof for removably receiving the depending leg;
   wherein the attaching means further comprises locking means for preventing the removal of the sunshade once it is in place; and
   wherein the locking means comprises a passage through the arms of the bracket for inserting one arm of a padlock.

5. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   in which the frame comprises a plurality of rigid arms;
   in which each arm has a depending leg, and the attaching means comprises a bracket secured to the vehicle roof for removably receiving the depending leg;
   in which each arm comprises two sections pivotally connected to each other so that the two sections (i) can be aligned parallel to the vehicle roof when mounted on the roof, and (ii) can be side-by-side so that the frame can be stored away; and
   wherein each arm has at least four sections pivotally connected to each other so that the sections (i) can be aligned parallel to the vehicle top when mounted and (ii) can be side-by-side to be compactly stored away.

6. The sunshade of claim 5 in which the sections are pivotally mounted to each other by pivot means comprising a pawl and ratchet.

7. A removable sunshade for a vehicle having a roof and windows, including at least a front window and one side window, the sunshade comprising:
   (a) a rigid supporting frame;
   (b) means for removably attaching the frame to the roof of a vehicle, the attaching means being secured to the vehicle roof; and
   (c) a flexible cover for the vehicle, the cover being adapted to be supported by the frame spaced apart from the vehicle roof and draping over the front and side windows of the vehicle to reduce heating of the vehicle's interior by the sun or discoloration of the interior of the vehicle by ultraviolet rays of the sun;
   in which the frame comprises a plurality of rigid arms; and
   in which each arm has at least four sections which are foldable bracings pivotally attached to the depending leg so that two sections (i) can be aligned parallel to the vehicle roof when mounted on the roof, and (ii) can be slid into a position alongside the depending leg so that the frame can be compactly stored away.

* * * * *